(12) United States Patent
Rompage et al.

(10) Patent No.: US 7,896,397 B2
(45) Date of Patent: Mar. 1, 2011

(54) SINGLE PIECE SIDE-SILL-GARNISH AND MUDGUARD

(75) Inventors: Adam Rompage, Raymond, OH (US); Darcy Letourneau, Raymond, OH (US); Erin Stringer, Raymond, OH (US)

(73) Assignee: Honda Motor Co., Ltd., Tokyo (JP)

( * ) Notice: Subject to any disclaimer, the term of this patent is extended or adjusted under 35 U.S.C. 154(b) by 258 days.

(21) Appl. No.: 11/964,883

(22) Filed: Dec. 27, 2007

(65) Prior Publication Data

US 2009/0167010 A1 Jul. 2, 2009

(51) Int. Cl.
*B62D 25/18* (2006.01)

(52) U.S. Cl. .......................... 280/848; 280/851; 280/154

(58) Field of Classification Search ............... 280/156, 280/158.1, 160, 847–851, 853–854, 153.5, 280/154; 296/209
See application file for complete search history.

(56) References Cited

U.S. PATENT DOCUMENTS

| | | | |
|---|---|---|---|
| 2,114,344 A | 4/1938 | Haberstump | |
| 3,622,195 A | 11/1971 | Lautenbach | |
| 4,021,055 A * | 5/1977 | Okland | 280/848 |
| 4,518,092 A | 5/1985 | Contreras | |
| 4,607,878 A * | 8/1986 | Itoh | 296/199 |
| 6,102,473 A * | 8/2000 | Steininger et al. | 296/209 |
| 6,155,624 A | 12/2000 | Bienenstein, Jr. | |
| 6,171,543 B1 | 1/2001 | Hirose | |
| 6,399,707 B1 | 6/2002 | Meka et al. | |
| 6,742,835 B1 * | 6/2004 | Floarea | 296/209 |
| 6,844,497 B2 | 1/2005 | Frantz et al. | |
| 6,926,352 B2 | 8/2005 | Gotou et al. | |
| 6,944,949 B2 | 9/2005 | Banry et al. | |
| 7,040,682 B2 | 5/2006 | Tokumoto et al. | |
| 7,083,224 B2 | 8/2006 | Yamamura et al. | |
| 7,083,833 B2 | 8/2006 | Shin et al. | |
| 7,083,844 B2 | 8/2006 | Yamamoto | |
| 7,121,618 B2 | 10/2006 | Uehara et al. | |
| 7,168,757 B2 | 1/2007 | Futatsuhashi | |
| 7,464,986 B2 * | 12/2008 | Maki | 296/209 |
| 2005/0241259 A1 * | 11/2005 | Rijsbergen et al. | 52/716.1 |
| 2006/0028056 A1 | 2/2006 | Aizawa et al. | |
| 2006/0145516 A1 | 7/2006 | Yamamoto | |
| 2007/0085361 A1 * | 4/2007 | Hauser | 296/1.08 |

FOREIGN PATENT DOCUMENTS

| | | |
|---|---|---|
| EP | 1375255 | 9/2005 |
| WO | WO2004/028859 | 4/2004 |
| WO | WO2004/028860 | 4/2004 |
| WO | WO2005/032918 | 4/2005 |

\* cited by examiner

*Primary Examiner* — J. Allen Shriver
*Assistant Examiner* — Erez Gurari
(74) *Attorney, Agent, or Firm* — Mark E. Duell, Esq.; Emerson Thomson Bennett (57) ABSTRACT

A one-piece-construction vehicle part may include both a mudguard portion and a side-sill-garnish portion.

16 Claims, 11 Drawing Sheets

SINGLE PIECE SIDE-SILL-GARNISH AND MUDGUARD

I. BACKGROUND OF THE INVENTION

A. Field of Invention

This invention pertains to the art of methods and apparatuses regarding the manufacture and assembly of vehicles, and more particularly to methods and apparatuses regarding the manufacture and assembly of side-sill-garnishes aid mudguards.

B. Description of the Related Art

Figure 11:
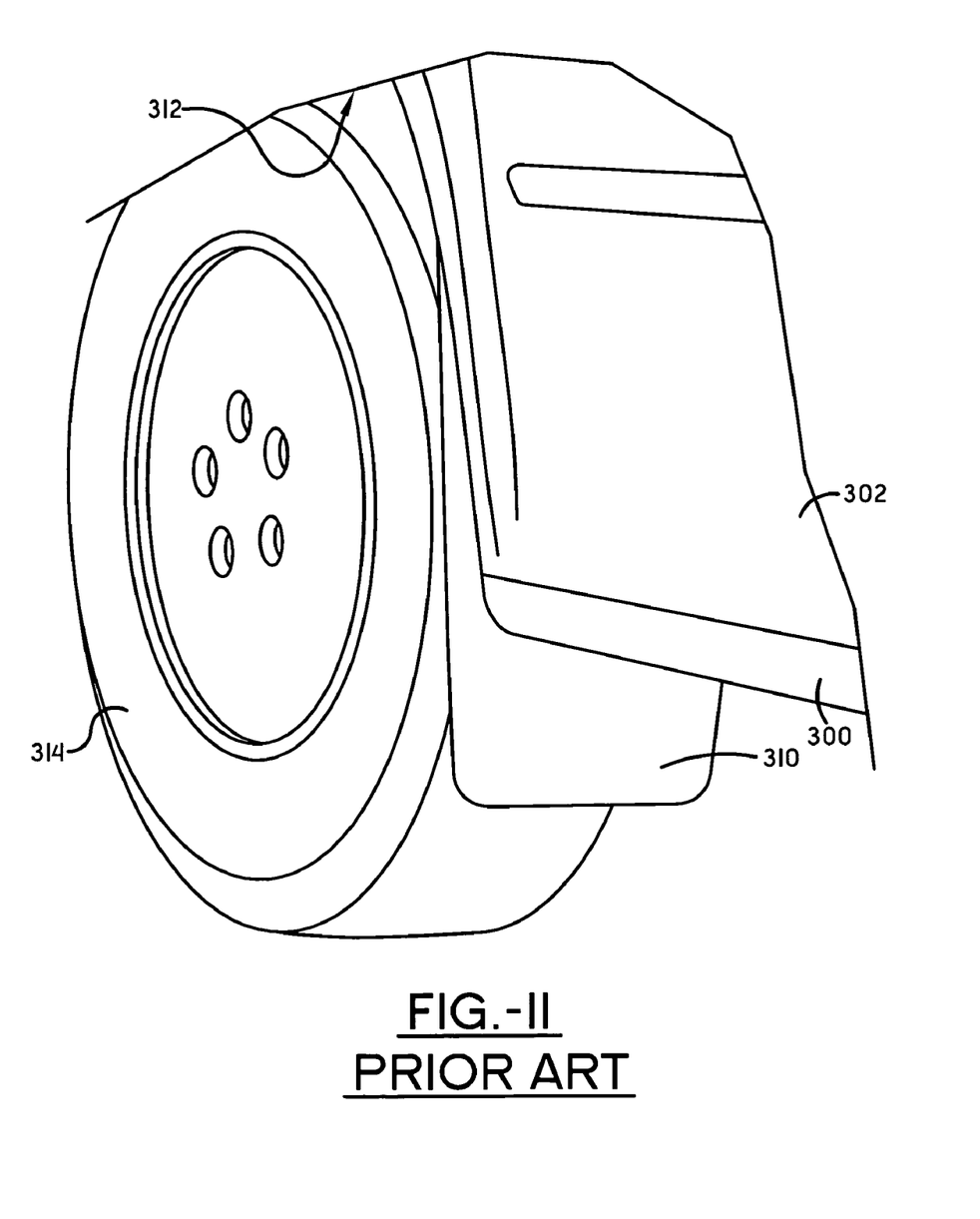
FIG. 11 is a perspective view of a prior art separate-piece-construction side-sill-garnish and mudguard showing the side-sill-garnish and mudguard as separate and distinct vehicle parts.

With reference to FIG. 11, it is well known in the automotive industry to provide automobiles with a component known as a side-sill-garnish 300. Generally, a side-sill-garnish 300 is attached to the outside of an automotive structural component called a side sill. The side-sill-garnish 300 is generally positioned just below a side door 302 and prevents water, dust, and external sound from entering the vehicle. One example of a side-sill-garnish is provided in U.S. Pat. No. 7,168,757 titled SIDE SILL GARNISH HAVING SOUND ABSORBING MEMBER WHICH INCLUDES OUTER PERIPHERAL RIGID PORTIONS, which is incorporated herein by reference. Another example of a side-sill-garnish is provided in U.S. Pat. No. 7,040,682 titled INSTALLATION STRUCTURE FOR A SIDE SILL GARNISH, which is also incorporated herein by reference. Still another example of a side-sill-garnish is provided in European Patent Specification EP 1 375 255 titled STRUCTURE OF COUPLING VEHICLE BODY EXTERIOR PARTS TO EACH OTHER, which is also incorporated herein by reference.

Figure 10:
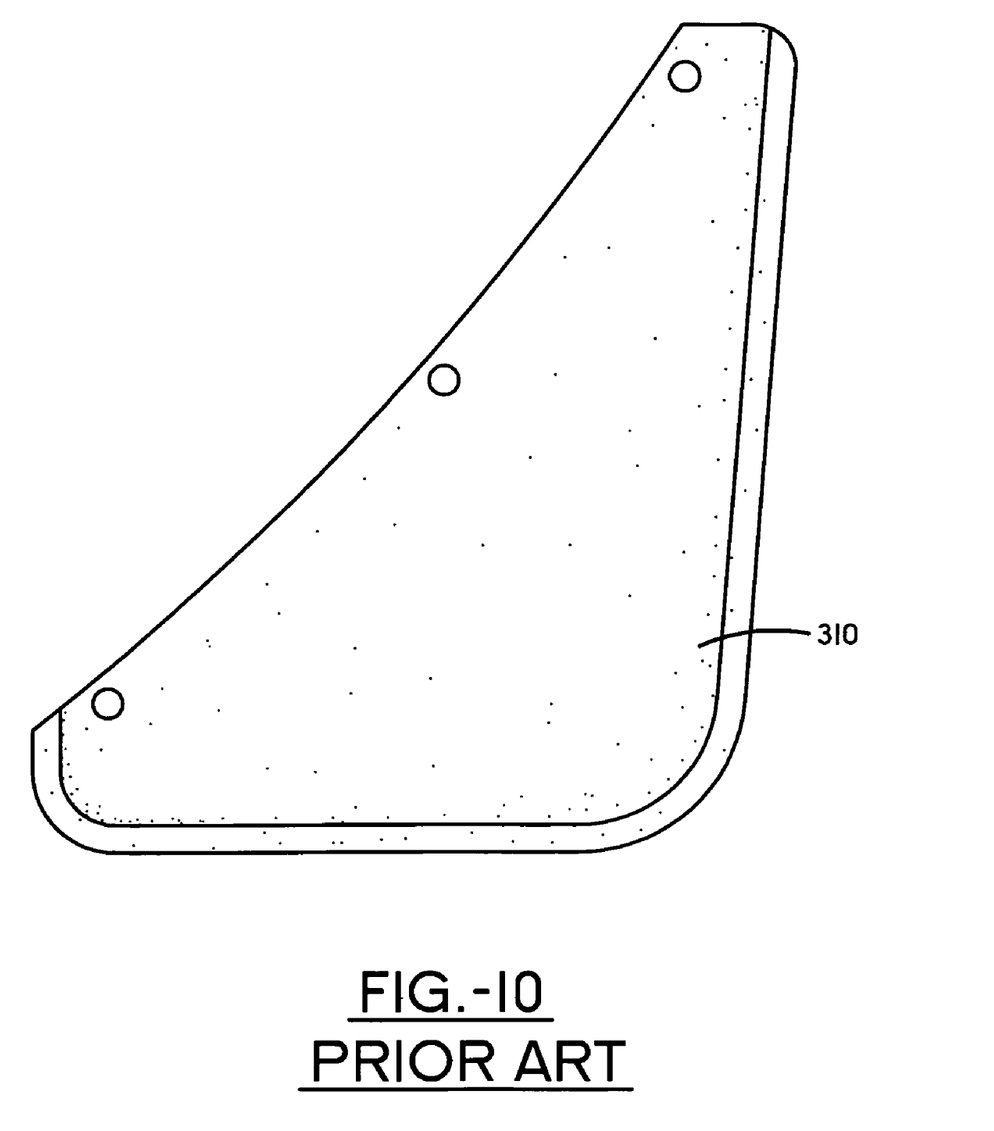
FIG. 10 is a perspective view of a prior art separate-piece-construction mudguard.

With reference now to FIGS. 10 and 11, it is also well known in the automotive industry to provide automobiles with a component known as a mudguard 310 (sometimes referred to as a mud flap or a splash guard.) Generally, a mudguard 310 is a shield located at least partially within the wheel well 312 that protects the vehicle against water, mud, dirt, stones and other road debris that is "thrown" by the wheel 314 as the vehicle is driven. A mudguard 310 may also serve to improve the "look" of the vehicle, making it more aesthetically appealing. It may, for example, have a color complementary too but distinct from the color of the door 302.

While known side-sill-garnishes and mudguards generally work well for their intended purposes, they have disadvantages. These disadvantages are related to the fact that known side-sill-garnishes and mudguards are separate, individual parts. One disadvantage is that the manufacturing process requires that each part be made independently from the other. This increases manufacturing costs. Another disadvantage is that the separate parts must be attached to the vehicle body separately. This increases assembly costs.

What is needed is a single-piece side-sill-garnish and mudguard that provides the functionality associated with the conventional components while eliminating duplicative tooling costs.

II. SUMMARY OF THE INVENTION

The present invention is directed to an apparatus that provides the functionality associated with the combination of a conventional side-sill-garnish and a conventional mudguard while eliminating duplicative tooling costs. In one embodiment, the present invention comprises a one-piece-construction vehicle part. The one-piece-construction vehicle part may include a mudguard portion and a side-sill-garnish portion.

According to another embodiment of this invention, the one-piece-construction vehicle party may be a single injection molded part.

According to another embodiment of this invention, the one-piece-construction part may include a hinge.

According to another embodiment of this invention, the hinge may be a flexible connector or a living hinge positioned to permit the mudguard portion and the side-sill-garnish portion to bend or flex relative to each other.

According to still another embodiment of this invention, a method may include the steps of: (a) providing a vehicle body with a side-sill and a wheel well juxtaposed to the side-sill; (b) providing a one-piece-construction vehicle part having a mudguard portion and a side-sill-garnish portion; and (c) and attaching the first one-piece-construction vehicle part to the vehicle body.

One advantage of this invention is that a single-piece-construction side-sill-garnish and mudguard may be manufactured in a single manufacturing process. In an injection molding process, this will allow for the utilization of a single mold in the manufacture of a single-piece-construction side-sill-garnish and mudguard. Additionally, an automobile manufacture may reduce the manufacturing expenses traditionally associated with the manufacture of two separate components (a distinct side-sill-garnish and a distinct mudguard).

Another advantage of this invention is that it may be attached to a vehicle body in a single application process thereby reducing the assembly expenses traditionally associated with the installation of two separate pieces. Further, application of this invention to a vehicle body may now be in a sideways or single axis direction. Application in a sideways or single axis direction may prevent an increase in assembly related expenses.

Still other benefits and advantages of the invention will become apparent to those skilled in the art to which it pertains upon a reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

IV. DETAILED DESCRIPTION OF THE INVENTION

Figure 1:
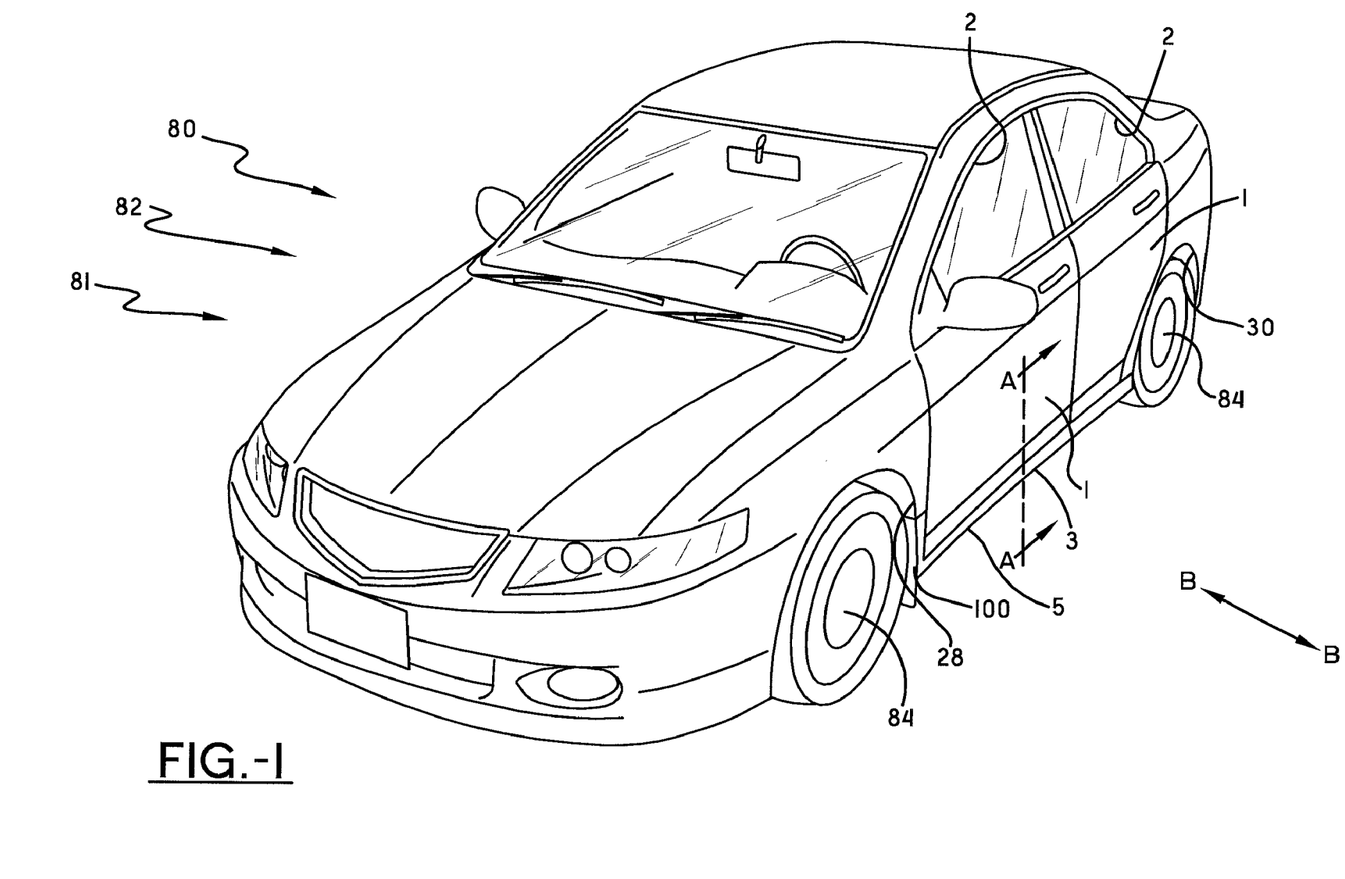
FIG. 1 is a perspective front view showing a vehicle equipped with a one-piece-construction side-sill-garnish and mudguard according to one embodiment of this invention.

Referring now to the drawings wherein the showings are for purposes of illustrating embodiments of the invention only and not for purposes of limiting the same, FIG. 1 shows a vehicle 80 equipped with a one-piece-construction vehicle part 3 having a mudguard portion 100 and a side-sill-garnish portion 5 according to one embodiment of this invention. While the vehicle shown is an automobile or car, it is to be understood that this invention will work with any type of vehicle including but not limited to, trucks, busses, and off-the-road vehicles. The vehicle 80 may have a vehicle body 81 that includes a side-sill 4 (shown in FIG. 2) and a pair of wheel wells 28, 30 on one side of the vehicle 80. The vehicle 80 may have a similar side-sill and similar wheel wells on the opposite side of the vehicle body 81. The vehicle 80 also may have a propulsion system 82, such as an internal combustion engine, an electric motor or a hybrid system, supported to the vehicle body 81 for use in providing locomotion for the vehicle 80 in a known manner. A plurality of ground engaging wheels 84, each of which may be at least partially positioned within a wheel well, may be attached to the vehicle body 81 and may be used in any conventional manner. The vehicle may also have at least one side door 1 (two shown) and an opening 2 to which each side door 1 is attached.

Figure 2:
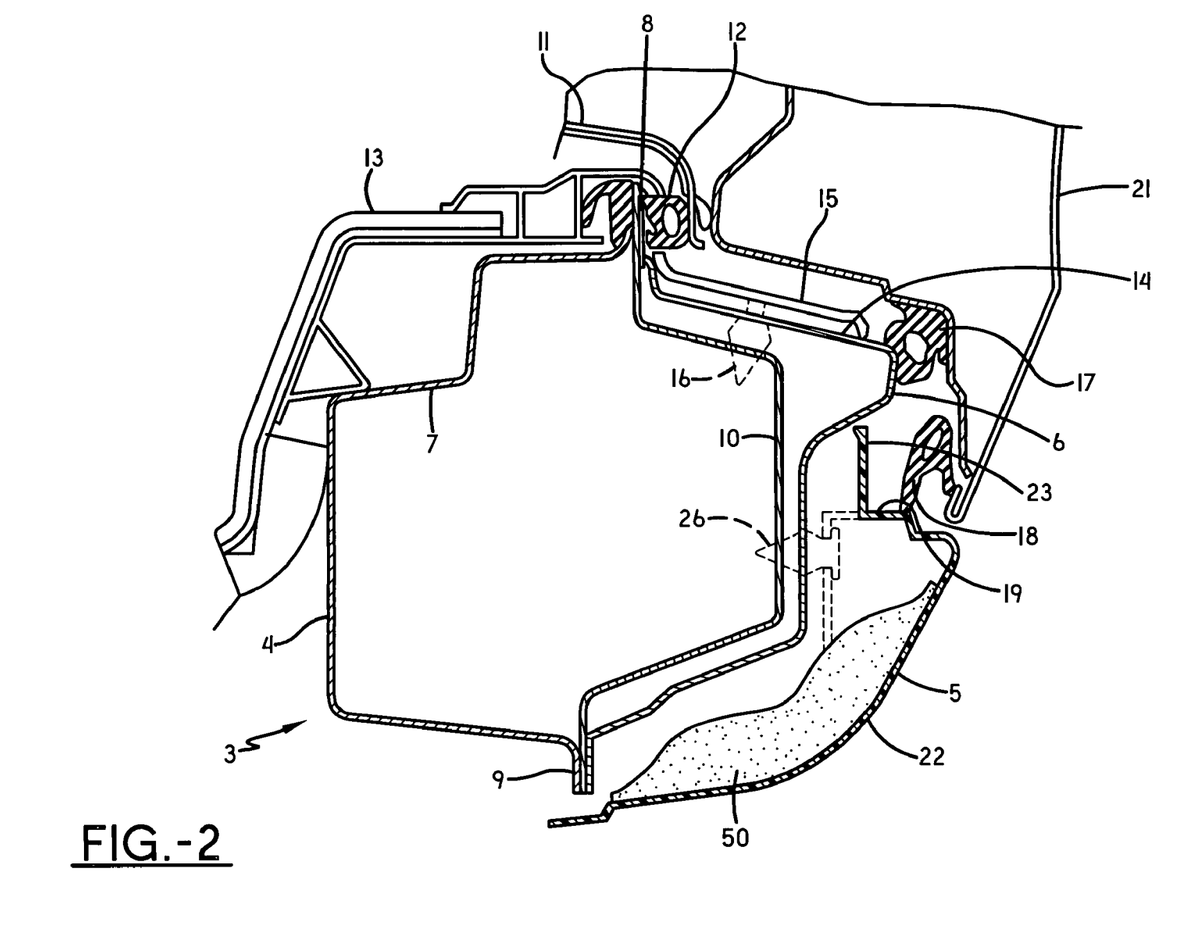
FIG. 2 is a sectional view taken along line A-A in FIG. 1.

With reference now to FIGS. 1 and 2, the one-piece-construction vehicle part 3 may include a mudguard portion 100 positioned at least partially within the wheel well 28 and a side-sill-garnish portion 5 positioned primarily under the opening 2 and used to cover and protect the side-sill 4. The side sill 4 is a frame member of the vehicle body 81 and may have a closed-section structure consisting of an outer sill panel 6 provided at the exterior of the vehicle 80, and an inner sill panel 7 provided in the interior of the vehicle 80. Between the outer sill panel 6 and the inner sill panel 7 a stiffener 10 may provided and may be supported at upper and lower joint flange portions 8 and 9, respectively. At the upper joint flange portion 8 of the side sill 4, a vehicle body seal 12 is provided. The body seal 12 may be in tight, or close, contact with an interior material 11 of the side door 1 when the side door 1 is closed. The upper joint flange portion 8 of the side sill 4, which may include a base portion of the vehicle body seal 12, may be covered with a lining 13 extending toward the floor.

With continuing reference to FIGS. 1 and 2, to an upper wall 14 of the outer sill panel 6, a step garnish 15 may attached using a clip 16. Close to the lower side of the step garnish 15, a first door seal 17 and a second door seal 18 may be provided and may be attached to a lower inner wall of the side door 1. The first door seal 17 may make tight contact with the outer sill panel 6, and the second door seal 18 may make tight contact with an upper wall 19 of the side sill garnish 5. The side sill garnish 5 may be attached at the outside of the outer sill panel 6 and may include a garnish main body 20 and a sound absorbing member 50 provided at the inside of the garnish main body 20. The garnish main body 20 may have an outer wall 22 which bends in such a manner as to be continuous with a door skin 21 which functions as an outer panel of the side door 1. On the upper portion of the outer wall 22, a shield wall 23 may be disposed at the inside of the second door seal 18 and provided for preventing water or the like from entering the vehicle 80. The lower edge of the outer wall 22 may extend to the vicinity of the lower joint flange portion 9 of the side sill 4. It should be understood that the just described side sill 4 is just one particular side sill design and that this invention will work with any side sill design chosen with sound engineering judgment.

Figure 3A:
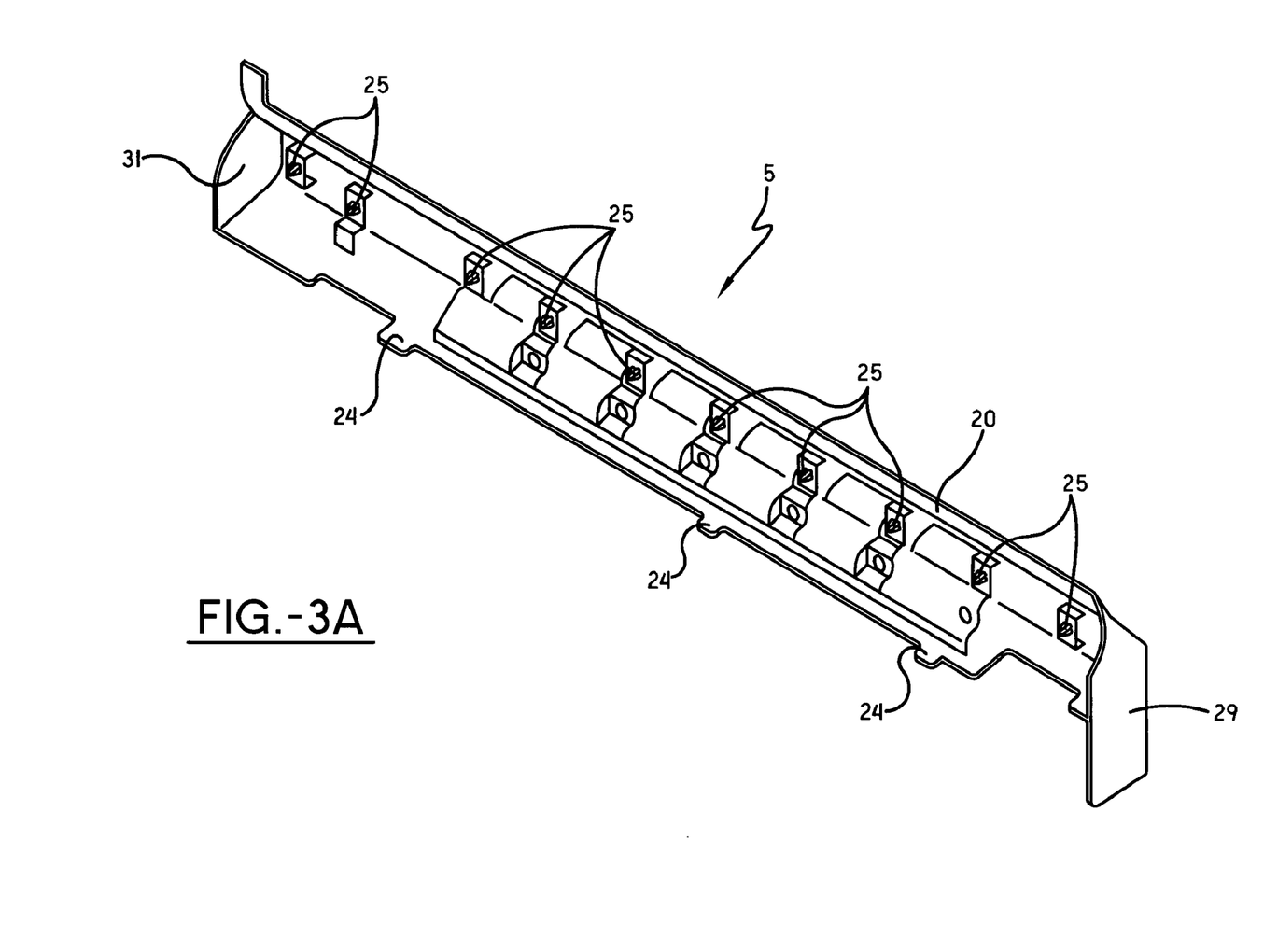
FIG. 3A is a perspective view of a one-piece-construction side-sill-garnish and mudguard according to one embodiment.
Figure 3B:
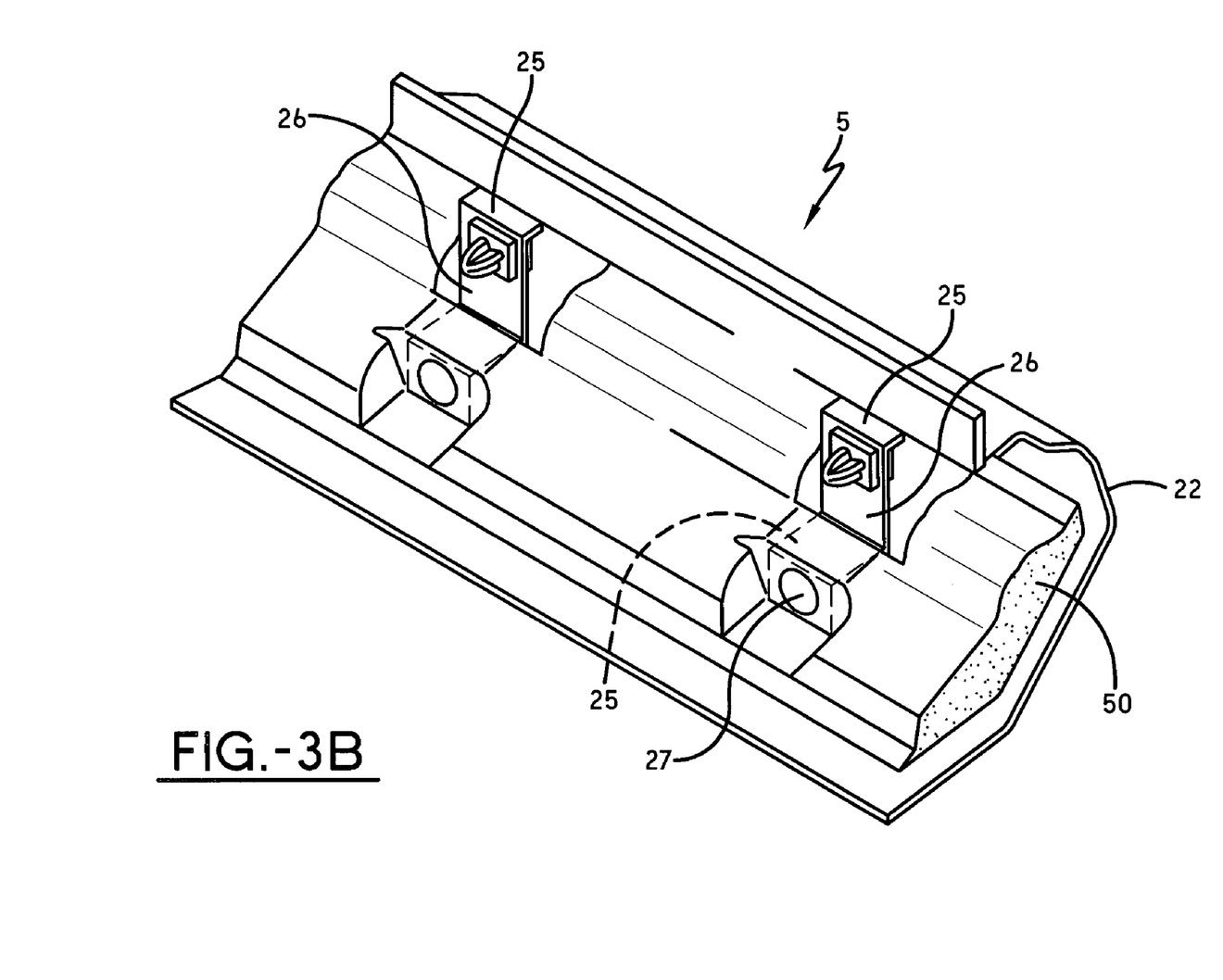
FIG. 3B is a perspective view of a portion of the one-piece-construction side-sill-garnish in FIG. 3A.
Figure 4:
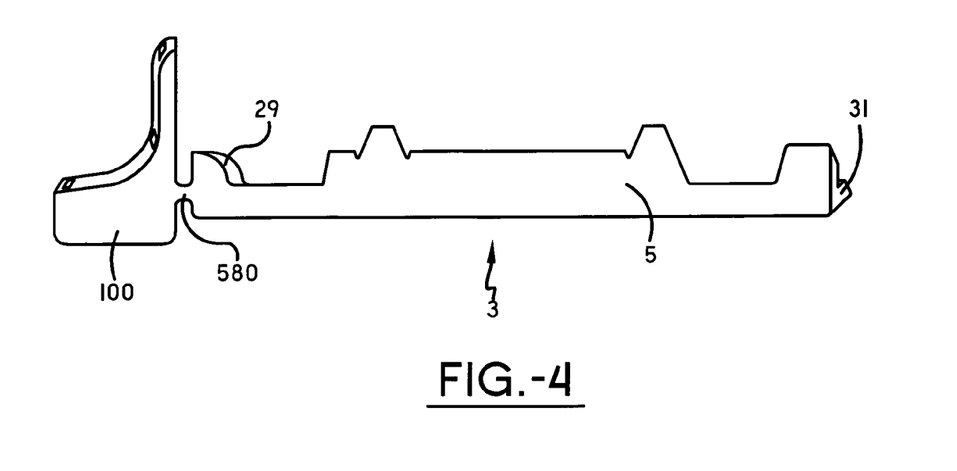
FIG. 4 is a perspective view of a one-piece-construction side-sill-garnish and mudguard according to another embodiment.
Figure 5:
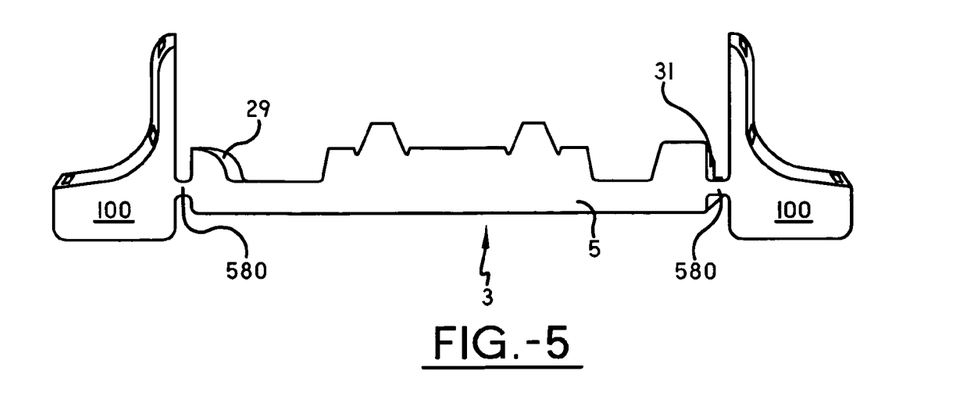
FIG. 5 is a perspective view of a one-piece-construction side-sill-garnish having two mudguard portions according to another embodiment.
Figure 6A:
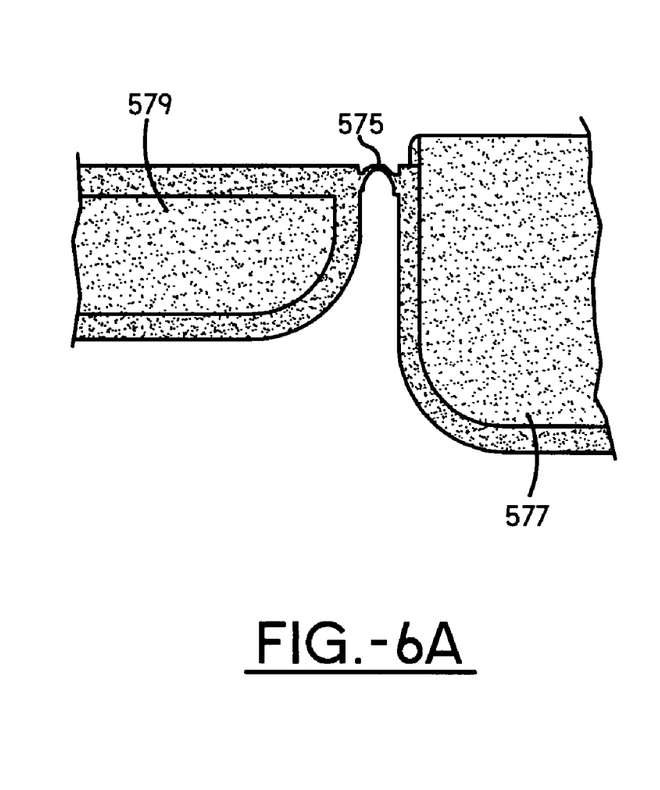
FIG. 6A is a perspective view of a thermoplastic polymer composition material co-acting elements, such as a base unit and its associated cover, molded as a single unit to provide a hinge or flexible connector in the unflexed or open position.
Figure 6B:
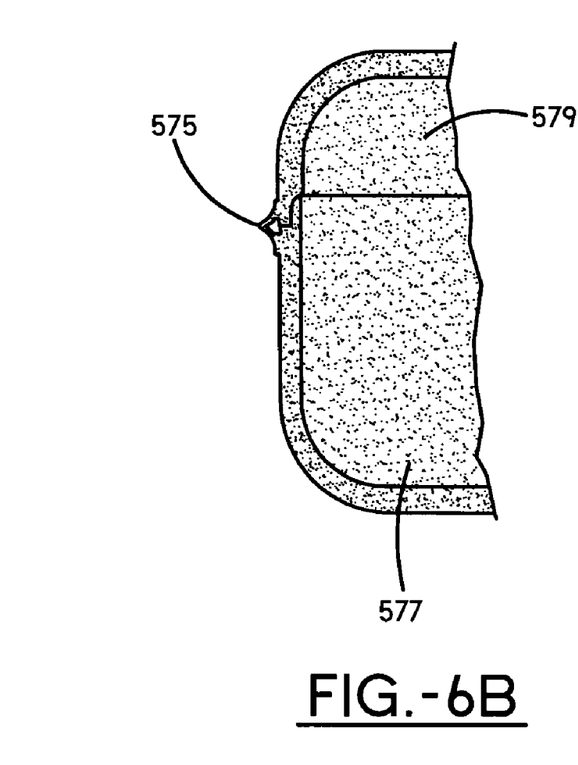
FIG. 6B is a perspective view of a thermoplastic polymer composition material co-acting elements, such as a base unit and its associated cover, molded as a single unit to provide a hinge or flexible connector in the flexed or closed position.
Figure 7:
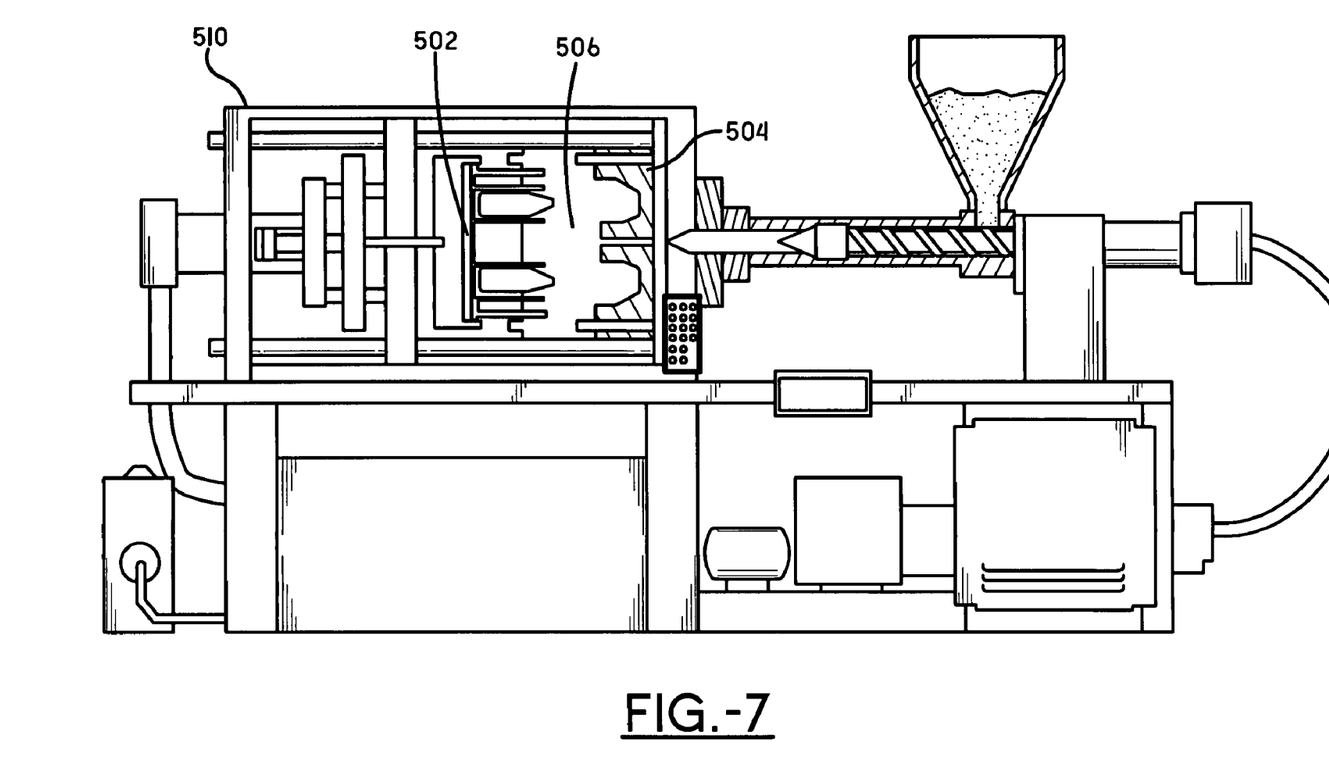
FIG. 7 is a perspective view of injection-molding equipment.
Figure 8:
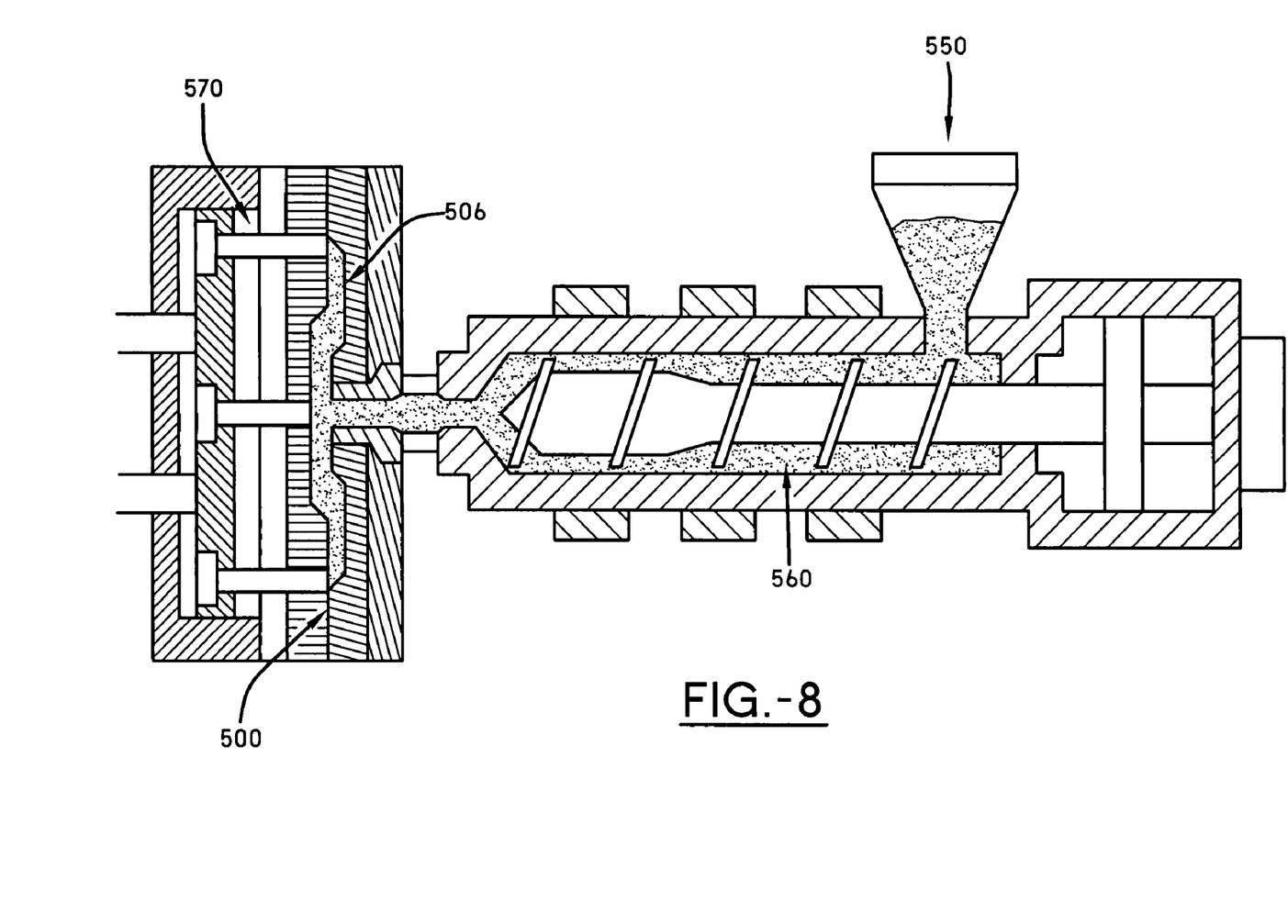
FIG. 8 is a schematic view of injection-molding equipment.
Figure 9:
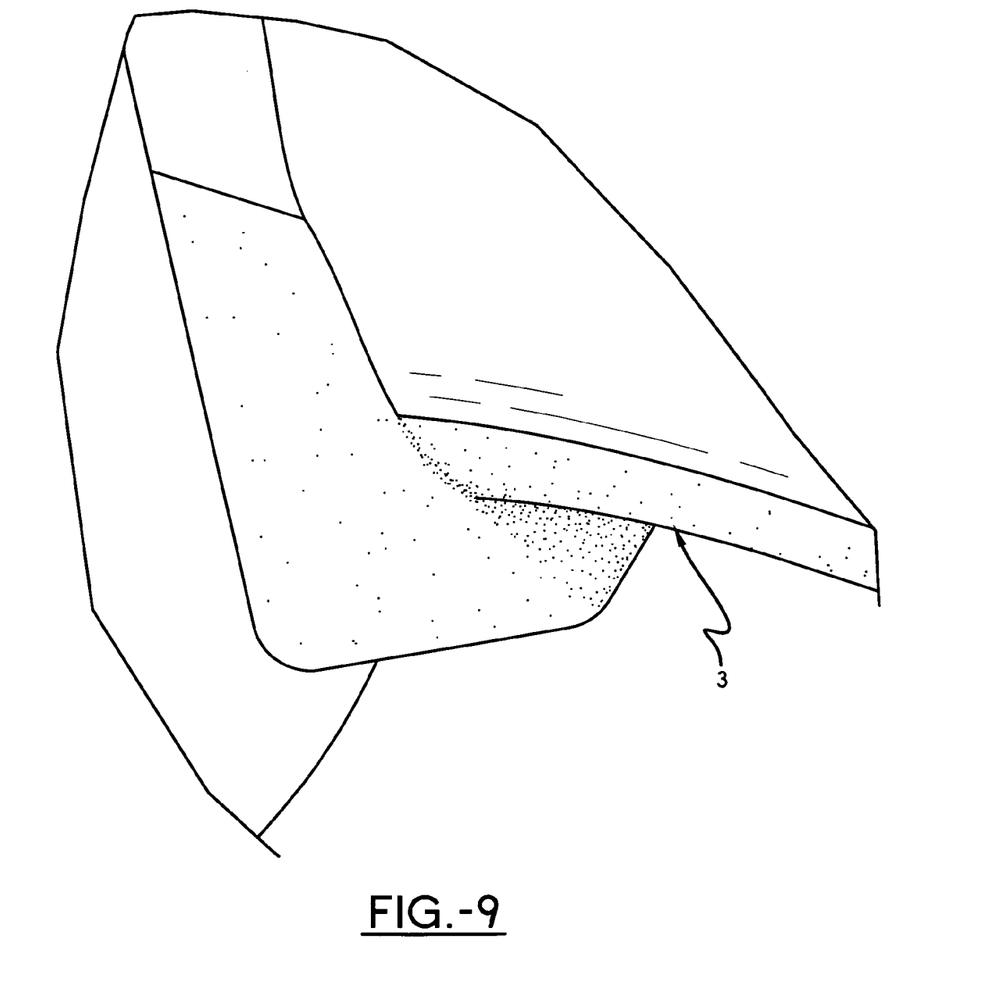
FIG. 9 is a close up back view of the one-piece-construction side-sill-garnish and mudguard shown in FIG. 1.

With reference now to FIGS. 1-3, the lower edge of the garnish main body 20 may have attachment portions 24 which are attached to the inner sill panel 7. In the outer wall 22, attachment portions 25 may be formed at regular intervals and may be positioned on the side of the outer wall 22 toward the interior of the vehicle 80. The garnish main body 20 may be fastened to the outer sill panel 6 and the stiffener 10 of the side sill 4 using clips 26 that are provided at the attachment portions 25. This invention will work well, however, using any method of attaching the side sill garnish 5 to the vehicle 80 chosen with sound engineering judgment. The sound absorbing member 50, which is not required for this invention, may be arranged on the inside of the outer wall 22 of the garnish main body 20 and may be attached to the attachment portions 251 of the garnish main body 20 using clips 27.

With reference now to FIG. 1-8, the garnish main body 20 may have a front end 29 which faces toward the front wheel well 28 and a rear end 31 which faces toward the rear wheel housing 30. In one embodiment, the mudguard 100 is attached at the front end 29 of the side-sill-garnish 5 and manufactured together with the side-sill-garnish 5 as a one-piece-construction vehicle part. In another embodiment, the mudguard 100 may be manufactured together with the side-sill-garnish 5 as a one-piece-construction vehicle part and may be pivotally attached to the side sill garnish 5 using, for example, a living hinge 580. By "one-piece-construction" it is meant a single, contiguous item. For one non-limiting example, in an injection molding process, a part formed by the high-pressure injection of molten plastic into a single-cavity mold wherein the single-cavity 506 defines the solid portions of the body of the part, represents a one-piece-construction part. This single, contiguous item or one-piece-construction vehicle part may be formed using any method chosen with sound engineering judgment.

With reference now to FIGS. 1-5, and 7-8, the one-piece-construction vehicle part 3, comprising a side-sill-garnish portion 5 and a mudguard portion 100, may be formed of a thermoplastic material using an injection molding process. Generally, injection molding is a manufacturing technique for making objects from a thermoplastic material 560. The injection molding process may require the use of a production tooling, commonly referred to as a mold 500, and an injection-molding machine, also known as a press 510. Traditionally, molds are expensive to manufacture and are constructed from hardened steel, pre-hardened steel, aluminum or beryllium copper. Economic considerations as well as the material's inherent properties commonly form the basis for choosing a particular mold-construction material. For example, steel molds generally cost more to construct, but have a longer lifespan than molds constructed from the other materials. The mold 500 commonly comprises at least a first section 502 and a second section 504. The mold 500 may be constructed in the inverse of the particular shape desired. A press 510 may hold the mold 500 closed while a thermoplastic material 560 such as acrylonitrile butadiene styrene (ABS), polypropylene, or polyethylene, is injected into the mold 500 at high pressures. The thermoplastic material 560 may be formed by melting a resin 550. Commonly, the resin 550 may be in pellet or granule form and melted by heat and shearing forces shortly before injection into the mold 500. After injection, the mold 500 may be cooled and the part extracted. Extraction may be by the use of extractor pins 570, air or any method chosen with sound engineering judgment. Injection-molded thermoplastic provides a relatively lightweight object with superior strength and durability in nearly any weather condition. Construction of the one-piece-construction vehicle part 3 is not limited to the method described herein, and may be constructed using any method chosen with sound engineering judgment.

Various embodiments have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

Having thus described the invention, it is now claimed:

1. An apparatus comprising:
   a one-piece-construction vehicle part comprising a mudguard and a side-sill-garnish;
   wherein the mudguard is a shield which protects an associated vehicle, including at least a portion of the side-sill-garnish, against road debris thrown by a wheel of the associated vehicle; and wherein the side-sill-garnish covers a portion of a side sill of the associated vehicle;
   wherein the mudguard is pivotally connected to the side-sill-garnish by a living hinge, which allows the mudguard to be non-coplanar with the side-sill-garnish.

2. The apparatus of claim 1 wherein the one-piece construction vehicle part is a single injection molded part.

3. A vehicle comprising:
   (a) a vehicle body comprising a first side-sill and a first wheel well juxtaposed to the first side-sill;
   (b) a first ground engaging wheel operatively connected to the vehicle and positioned at least partially within the first wheel well;
   (c) a propulsion system supported to the vehicle body and for use in providing locomotion for the vehicle; and,
   (d) a first one-piece-construction vehicle part having a first mudguard and a side-sill-garnish, the first mudguard being positioned at least partially within the first wheel well and the side-sill-garnish covering at least a portion of the first side-sill;
   wherein at least a portion of the first mudguard extends below the side-sill-garnish;
   wherein the mudguard is pivotally connected to the side-sill-garnish by a living hinge, which allows the mudguard to be non-coplanar with the side-sill-garnish.

4. The vehicle of claim 3 wherein the first one-piece-construction vehicle part comprises a single injection molded part.

5. The vehicle of claim 3 wherein the first wheel well is positioned toward the front of the vehicle body.

6. The vehicle of claim 3 further comprising:
   wherein the vehicle body comprises a second side-sill and a second wheel well juxtaposed to the second side-sill;
   a second ground engaging wheel operatively connected to the vehicle body and positioned at least partially within the second wheel well; and,
   a second one-piece-construction vehicle part having a first mudguard and a side-sill-garnish, the first mudguard being positioned at least partially within the second wheel well and the side-sill-garnish covering at least a portion of the second side-sill;
   wherein at least a portion of the first mudguard extends below the side-sill-garnish.

7. A method comprising the steps of:
   (a) providing a vehicle body comprising a first side-sill and a first wheel well juxtaposed to the first side-sill;
   (b) providing a first one-piece-construction vehicle part having a first mudguard and a side-sill-garnish, wherein the mudguard is pivotally connected to the side-sill-garnish by a living hinge, which allows the mudguard to be non-coplanar with the side-sill-garnish; and,
   (c) attaching the first one-piece-construction vehicle part to the vehicle body such that the first mudguard is positioned at least partially within the first wheel well and the side-sill-garnish covers at least a portion of the first side-sill, wherein at least a portion of the first mudguard extends below the side-sill-garnish.

8. The method of claim 7 further comprising the steps of:
   providing the vehicle body with a second side-sill and a second wheel well juxtaposed to the second side-sill;
   providing a second one-piece-construction vehicle part having a first mudguard and a side-sill-garnish; and,
   attaching the second one-piece-construction vehicle part to the vehicle body such that the first mudguard is positioned at least partially within the second wheel well and the side-sill-garnish covers at least a of the second side-sill, wherein at least a portion of the first mudguard extends below the side-sill-garnish.

9. The method of claim 7 wherein step (b) comprises the step of:
   molding the first mudguard and the side-sill-garnish in the same tool.

10. The apparatus of claim 1 wherein at least a portion of the mudguard extends below the side-sill-garnish.

11. The apparatus of claim 1 wherein at least a first portion of the mudguard extends below the side-sill-garnish and at least a second portion of the mudguard extends above the side-sill-garnish.

12. The apparatus of claim 1 wherein at least a portion of the mudguard extends along a width of the wheel.

13. The apparatus of claim 1 wherein the mudguard is located near a first end of the side-sill-garnish and a second mudguard is located near a second end of the side-sill-garnish.

14. The vehicle of claim 3 wherein at least a portion of the first mudguard extends along a width of the first ground engaging wheel.

15. The vehicle of claim 3 wherein the first mudguard is located near a first end of the side-sill-garnish and a second mudguard is located near a second end of the side-sill-garnish.

16. The method of claim 7 wherein at least a portion of the first mudguard extends along a width of a wheel, which is at least partially located within the first wheel well.

* * * * *